(12) United States Patent
Kristensson et al.

(10) Patent No.: US 9,389,733 B2
(45) Date of Patent: Jul. 12, 2016

(54) MODAL BODY TOUCH USING ULTRASOUND

(71) Applicant: Sony Corporation, Tokyo (JP)

(72) Inventors: Andreas Kristensson, Söndra Sandby (SE); Alexander Hunt, Tygelsjö (SE); Ola Thörn, Limhamn (SE); Magnus Landqvist, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 0 days.

(21) Appl. No.: 14/461,621

(22) Filed: Aug. 18, 2014

(65) Prior Publication Data

US 2016/0048231 A1    Feb. 18, 2016

(51) Int. Cl.

| | | |
|---|---|---|
| G06F 3/043 | (2006.01) | |
| G06F 3/01 | (2006.01) | |
| G06F 3/0488 | (2013.01) | |
| G04G 21/00 | (2010.01) | |
| G04G 21/08 | (2010.01) | |
| G06F 1/16 | (2006.01) | |
| G06F 3/041 | (2006.01) | |
| H04N 21/422 | (2011.01) | |

(52) U.S. Cl.
CPC .............. *G06F 3/043* (2013.01); *G04G 21/00* (2013.01); *G04G 21/08* (2013.01); *G06F 1/163* (2013.01); *G06F 3/011* (2013.01); *G06F 3/017* (2013.01); *G06F 3/041* (2013.01); *G06F 3/04883* (2013.01); *H04N 21/422* (2013.01); *G06F 2203/04108* (2013.01); *G06F 2203/04808* (2013.01)

(58) Field of Classification Search
None
See application file for complete search history.

(56) References Cited

U.S. PATENT DOCUMENTS

| | | | | |
|---|---|---|---|---|
| 5,745,719 | A  * | 4/1998 | Falcon ................ | G06F 3/04883 715/856 |
| 7,148,879 | B2 * | 12/2006 | Amento ................. | G06F 3/017 345/158 |
| 8,908,894 | B2 * | 12/2014 | Amento ................. | H04K 1/00 381/151 |
| 8,988,373 | B2 * | 3/2015 | Thorn ..................... | G06F 3/011 345/173 |
| 9,037,530 | B2 * | 5/2015 | Tan ....................... | A61B 5/0488 706/62 |

(Continued)

FOREIGN PATENT DOCUMENTS

WO    2014/064506 A2    5/2014

OTHER PUBLICATIONS

Mujibiya, Adiyan, et al. "The Sound of Touch: On-body Touch and Gesture Sensing Based on Transdermal Ultrasound Propagation". ITS '13, Oct. 6-9, 2013, St Andrews, United Kingdom.

(Continued)

*Primary Examiner* — Antonio Xavier
(74) *Attorney, Agent, or Firm* — Tucker Ellis LLP (57) ABSTRACT

A method, a device, and a non-transitory storage medium having instructions to detect, via an ultrasound transducer, an ultrasound event that includes an ultrasound signal that is transdermally propagated on the body of a user and generated by an on-body touch in an area in which the ultrasound signal has propagated; detect a state of a limb of the user on which the device is worn, wherein the state is a contracted state or a relaxed state; and select an input based on the receipt of the ultrasound signal and the state of the limb. An accelerometer may be used to detect muscle tremor and determine whether the state of the limb.

18 Claims, 6 Drawing Sheets

(56) References Cited

U.S. PATENT DOCUMENTS

| | | | | |
|---|---|---|---|---|
| 2004/0024312 A1* | 2/2004 | Zheng | A61B 5/1038 | 600/437 |
| 2004/0243342 A1* | 12/2004 | Rekimoto | G06F 3/011 | 702/150 |
| 2008/0158432 A1* | 7/2008 | Hwang | H01Q 1/24 | 348/725 |
| 2008/0306572 A1* | 12/2008 | Osada | A61M 21/00 | 607/54 |
| 2009/0083850 A1* | 3/2009 | Fadell | G06F 21/316 | 726/19 |
| 2010/0056873 A1* | 3/2010 | Allen | A61B 5/002 | 600/300 |
| 2010/0066664 A1* | 3/2010 | Son | G06F 1/163 | 345/156 |
| 2010/0249642 A1* | 9/2010 | Cha | A61B 5/0537 | 600/547 |
| 2011/0054360 A1 | 3/2011 | Son | | |
| 2011/0071419 A1* | 3/2011 | Liu | A61B 5/0053 | 600/547 |
| 2011/0112605 A1* | 5/2011 | Fahey | A61N 1/0452 | 607/48 |
| 2011/0163872 A1* | 7/2011 | Pasveer | G01S 15/025 | 340/539.12 |
| 2011/0227856 A1* | 9/2011 | Corroy | H04B 13/005 | 345/173 |
| 2012/0162057 A1* | 6/2012 | Tan | G06F 3/011 | 345/156 |
| 2012/0268422 A1* | 10/2012 | Hirakawa | G06F 1/3203 | 345/174 |
| 2013/0265241 A1* | 10/2013 | Thorn | G06F 3/011 | 345/173 |
| 2015/0031299 A1* | 1/2015 | Holman | H04W 4/005 | 455/41.2 |
| 2015/0128094 A1* | 5/2015 | Baldwin | G06F 3/017 | 715/863 |

OTHER PUBLICATIONS

Mol, Chris R. and Breddels, Paul A. "Ultrasound velocity in muscle". J. Acoust. Soc. Am. 71, 455 (1982); http://dx.doi.org/10.1121/1.387467.

Strachan, Steven and Murray-Smith, Roderick. "Muscle Tremor as an Input Mechanism". UIST '04, Oct. 24-27, 2004, Santa Fe, New Mexico, USA.

International Search Report and Written Opinion from corresponding International Application No. PCT/US2015/037332, mailed Oct. 14, 2015.

* cited by examiner

MODAL BODY TOUCH USING ULTRASOUND

BACKGROUND

A mobile device, such as a smartphone, offers various services to their users. Users may interact with the displays of the mobile devices via touch panels and/or touchless panels. While touch and touchless input technologies allow users a great deal of flexibility when operating the mobile devices, designers and manufacturers are continually striving to improve the interoperability of the mobile device with the user.

SUMMARY

According to one aspect, a method may comprise detecting, by a device that is wearable by a user, an ultrasound event that includes receipt of an ultrasound signal that transdermally propagated on the body of the user and effected by an on-body touch in an area in which the ultrasound signal has propagated; detecting, by the device, a state of a limb of the user on which the device is worn, wherein the state is a contracted state or a relaxed state; and selecting, by the device, an input based on the receipt of the ultrasound signal and the state of the limb.

Additionally, the method may comprise transmitting the input to another device; and executing the input by the other device.

Additionally, the method may comprise detecting movement of the limb of the user; and determining whether the state of the limb is in the contracted state based on the detecting of the movement of the limb.

Additionally, the input may be one of an input that can be made via a mouse, a keyboard, or a touch display.

Additionally, the method may comprise analyzing a characteristic of the ultrasound signal received, wherein the characteristic includes at least one of frequency, amplitude, or propagation speed; and identifying a type of on-body touch based on the analyzing.

Additionally, the input may be application-specific.

Additionally, the on-body touch may be a tap or a sliding gesture.

According to another aspect, a device may comprise an ultrasound transducer; an accelerometer; a memory, wherein the memory stores software; and a processor, wherein the processor executes the software. The device may be configured to detect, via the ultrasound transducer, an ultrasound event that includes an ultrasound signal that transdermally propagated on the body of a user and effected by an on-body touch in an area in which the ultrasound signal has propagated; detect a state of a limb of the user on which the device is worn, wherein the state is a contracted state or a relaxed state; and select an input based on the receipt of the ultrasound signal and the state of the limb.

Additionally, the device may comprise a communication interface. The device may be configured to transmit, via the communication interface, the input to another device.

Additionally, the accelerometer may detect movement of the limb, and the device may be configured to determine whether the state of the limb is in the contracted state or the relaxed state during a time of the on-body touch based on data received from the accelerometer.

Additionally, the input may be one of an input that can be made via a mouse, a keyboard, or a touch display.

Additionally, the device may be configured to analyze a characteristic of the ultrasound signal received, wherein the characteristic includes at least one of frequency, amplitude, or propagation speed; and identify a type of on-body touch based on an analysis of the characteristic.

Additionally, the device may be configured to store a database that maps ultrasound signal profiles, states of the limb, and inputs; and use the database to select the input.

Additionally, the device may be configured to identify an on-body touch that indicates to activate ultrasound sensing.

Additionally, the device may comprise a machine learning module that allows the user to train the device to recognize particular on-body touch events performed by the user and select inputs corresponding to the on-body touch events.

According to yet another aspect, a non-transitory storage medium may store instructions executable by a processor of a computational device, which when executed, cause the computational device to: detect, via an ultrasound transducer of the computational device, an ultrasound event that includes an ultrasound signal that transdermally propagated on the body of a user and effected by an on-body touch in an area in which the ultrasound signal has propagated; detect a state of a limb of the user on which the computational device is worn, wherein the state is a contracted state or a relaxed state; and select an input based on the receipt of the ultrasound signal and the state of the limb.

Additionally, the instructions may comprise instructions to analyze a characteristic of the ultrasound signal received, wherein the characteristic includes at least one of frequency, amplitude, or propagation speed; and identify a type of on-body touch based on an analysis of the characteristic.

Additionally, the instructions may comprise instructions to store a database that maps ultrasound signal profiles, states of the limb, and inputs; and use the database to select the input.

Additionally, the instructions may comprise instructions to identify an on-body touch that indicates to activate ultrasound sensing.

Additionally, the instructions may comprise instructions to determine whether the state of the limb is in the contracted state or the relaxed state during a time of the on-body touch based on data received from an accelerometer.

DETAILED DESCRIPTION OF PREFERRED EMBODIMENTS

The following detailed description refers to the accompanying drawings. The same reference numbers in different drawings may identify the same or similar elements.

Ultrasound transmission and sensing through a user's body has become a recent area of research. For example, the user may wear a wristlet, an armband, or other type of wearable device (e.g., headwear, etc.) in which ultrasonic signals are transmitted and propagated via the user's skin (e.g., transdermal ultrasound propagation). The wearable device includes a transmitter, which transmits the ultrasonic signal, and a receiver, which receives the ultrasonic signal. According to an exemplary use case, when the wearable device is a wristlet, the user may touch his or her skin with his or her finger on the arm, grip the arm, or perform a slide movement on the arm. The ultrasonic signal may be measured at one or multiple frequencies and/or amplitudes via the receiver. Based on the received value(s) and stored signal profiles, the type of input performed by the user can be determined. For example, the user may tap his or her forearm at a particular location and this information (i.e., tap and location) may be determined. This information can be used as an input to a device other than the wearable device.

Unfortunately, ultrasound on-body touch sensing technology is limited to the number of touch points proximate to the sensing equipment. Additionally, this form of input method is prone to be activated accidentally, unless the user has to interact with the mobile device or the wearable device before going into "ultrasound sensing mode."

Ultrasound propagation through muscle tissue travels at different speeds depending on how taut one's muscle is made. For example, the velocity of ultrasound propagation may be increased (e.g., up to 3 m/s) when a muscle is contracted due to the blood content of the muscle.

According to an exemplary embodiment, a modal interface based on ultrasound sensing is provided. According to an exemplary embodiment, a wearable device detects different modes of interface based on whether the user's muscle is contracted or not. For example, according to an exemplary embodiment, one mode of operation is when the user's muscle is in a relaxed state and another mode of operation is when the user's muscle is in a contracted or taut state. According to yet another embodiment, one mode of operation is when the user transitions from the relaxed state to contracted state or vice versa within a certain period of time. For example, when the user contracts his or her fist and then relaxes it within one second, the user's action (e.g., sliding his or her finger along his or her arm) is interpreted as a particular input. According to still another embodiment, multiple modes of operation are provided based on multiple degrees or levels of contraction of the user's muscle. In view of the different modes of operation, different inputs may be mapped to each mode and, more particularly, each type of action performed by the user (e.g., tap, grasp of limb, sliding gesture, etc.), as well as other factors (e.g., location, pressure, time (e.g., onset and offset of an action).

According to an exemplary embodiment, the detection of whether the user's muscle is contracted or a degree of contraction includes using data from an accelerometer. According to an exemplary embodiment, the wearable device includes the accelerometer. According to an exemplary embodiment, the accelerometer detects muscle tremor, which normally occurs when the user flexes or contracts his or her muscle. While some degree a muscle tremor may occur even when the user's muscle is in a relaxed state, the accelerometer may provide data to determine a degree of muscle tremor that relates to flexing and/or other degrees of muscle contraction. In this way, in addition to or instead of propagation differences of ultrasound when the user's muscle is in a contracted state versus a relaxed state, muscle tremor information is used to determine whether the user's muscle is contracted. Additionally, muscle tremor information may be used to determine a degree of contraction (e.g., fully taut, partially taut, etc.).

According to an exemplary embodiment, the wearable device constitutes a main device. For example, the wearable device may include a display and have various capabilities, such as a telephone, web access, media player, and/or another type of device with different functions or services. According to another embodiment, a main device receives input via the wearable device. For example, the main device may take the form of a mobile device. As inputs are interpreted based on the ultrasound technology and user actions, these inputs are transmitted by the wearable device to the main device. The main device operates according to the received inputs.

According to an exemplary embodiment, the wearable device or the main device allows the user to manually lock in a particular mode. For example, the wearable device or the main device may provide a user interface or some other type of input mechanism (e.g., a button, vocal command, etc.) that allows the user to transition into and operate in a particular sensing mode. According to another exemplary embodiment, the wearable device allows the user to lock in a mode by performing a particular action. For example, when the user's arm is in a relaxed state, such a state signifies a "locked" or a "dormant" state, in that only when the user's fist is clenched or other deliberate action is performed, will touch events be detected. In this way, the sensing features of the wearable device can be easily activated and deactivated by the user without the user having to manually activate and deactivate the wearable device.

Figure 1A:
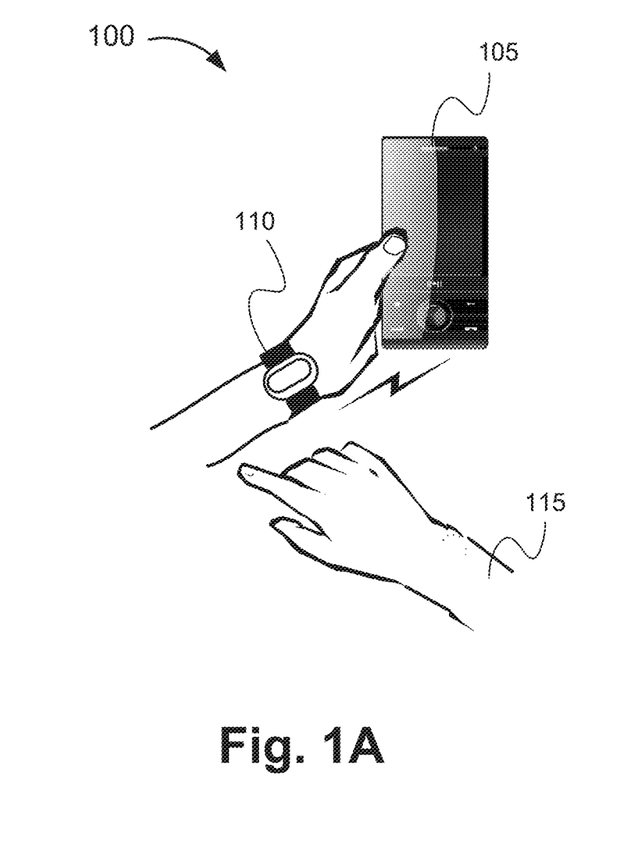
FIG. 1A is a diagram illustrating an exemplary environment in which exemplary embodiments of modal body touch ultrasound sensing may be implemented.
Figure 1B:
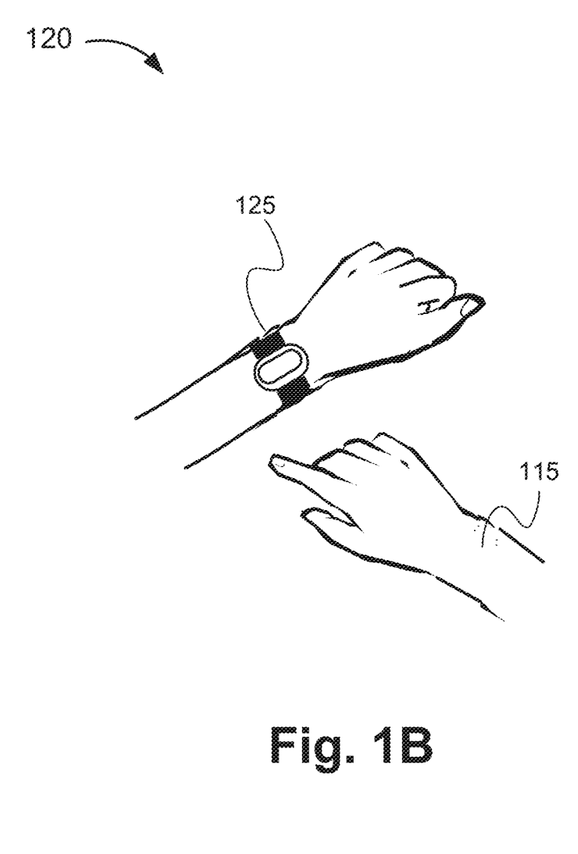
FIG. 1B is a diagram illustrating another exemplary environment in which exemplary embodiments of modal body touch ultrasound sensing may be implemented.

FIG. 1A is a diagram of an exemplary environment 100 in which exemplary embodiments of modal body touch ultrasound sensing may be implemented. As illustrated, environment 100 includes a main device 105, an ultrasound device 110, and a user 115. FIG. 1B is a diagram of another exemplary environment 120 in which exemplary embodiments of modal body touch ultrasound sensing may be implemented. As illustrated, environment 120 includes user 115 and an ultrasound main device 125. According to this embodiment, as previously described, the wearable device may include ultrasound sensing and main device capabilities.

Although FIGS. 1A and 1B each illustrate a wristlet type of ultrasound device, according to other embodiments, other forms of ultrasound devices may be implemented, such as an armlet, a head device, a neck device, an ankle device, etc. Additionally, the ultrasound device may include multiple devices. For example, one device may transmit ultrasound and another device may receive the ultrasound. According to such a configuration, the user may wear one device in one location of the user's body and the other device in another location of the user's body.

Referring to FIG. 1A, main device 105 includes a user device. For example, main device 105 may take the form of a mobile device, such as a smartphone, a personal digital assistant (PDA), a tablet device, a palmtop device, a netbook, a music playing device, a web device, or other computational device. Alternatively, main device 105 may take the form of a non-mobile device, such as a smart television or other suitable device. Main device 105 receives input signals from ultrasound device 110 and operates according to the input signals. Main device 105 is described further below.

Ultrasound device 110 includes a device that transmits and receives ultrasound signals. For example, ultrasound device 110 includes ultrasound transducers. The ultrasound transducers include a transducer that acts as a transmitter of ultrasound and another transducer that acts as a receiver of the ultrasound. Based on a user's on-body interaction, ultrasound device 110 identifies a mode and action based on the value of the signal received via the ultrasound receiver. According to an exemplary embodiment, ultrasound device 110 includes an accelerometer. Ultrasound device 110 uses data from the accelerometer to determine the mode of on-body touch sensing. Ultrasound device 110 correlates the mode and the user action (e.g., tap, sliding gesture, etc.) to a particular input. Ultrasound device 110 generates and transmits an input signal to main device 105. In turn, main device 105 receives and operates in accordance with the input. Ultrasound device 110 is described further below.

Referring to FIG. 1B, ultrasound main device 125 includes ultrasound device 110. Additionally, ultrasound main device 125 includes one or multiple end-user applications and/or services that are responsive to the user's on-body interaction.

Figure 2A:
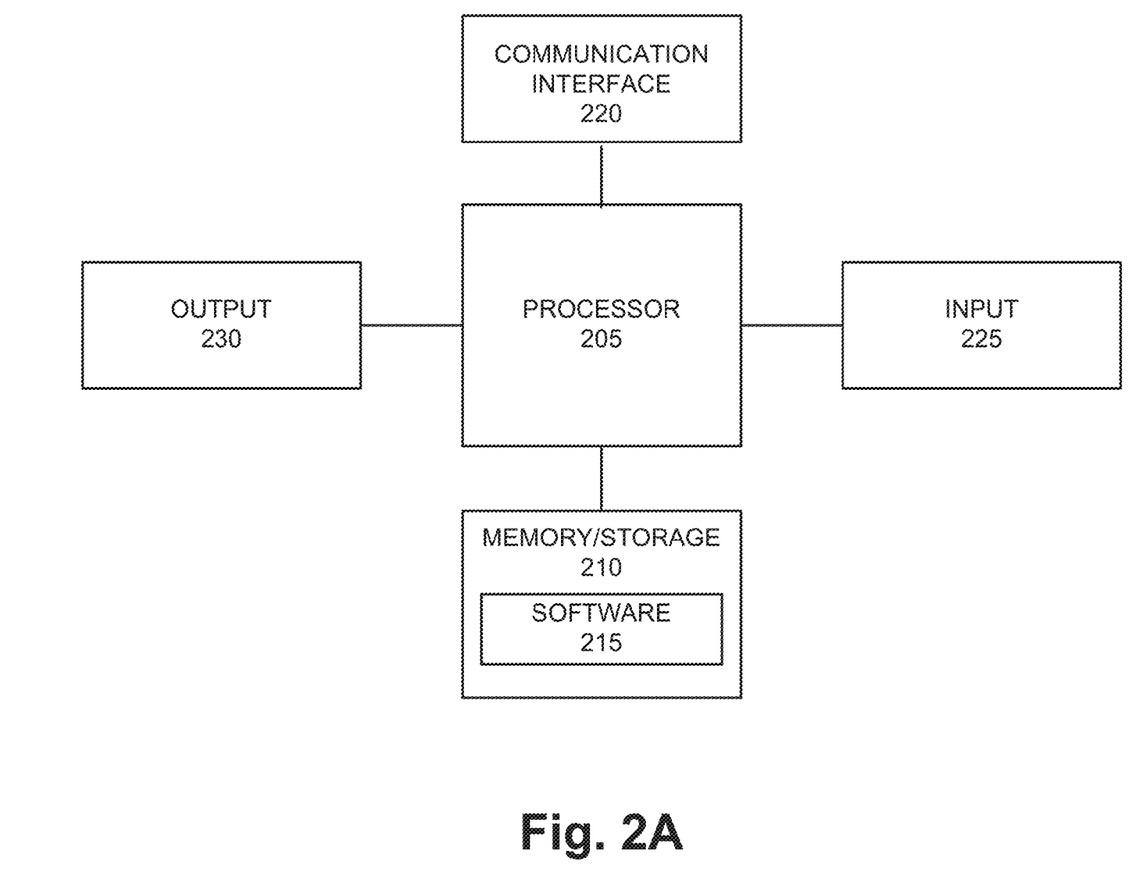
FIG. 2A is a diagram illustrating exemplary components of a main device.

FIG. 2A is a diagram illustrating exemplary components of main device 105. As illustrated, according to an exemplary embodiment, main device 105 includes a processor 205, memory/storage 210, software 215, a communication interface 220, an input 225, and an output 230. According to other embodiments, main device 105 may include fewer components, additional components, different components, and/or a different arrangement of components than those illustrated in FIG. 2A and described herein.

Processor 205 includes one or multiple processors, microprocessors, data processors, co-processors, and/or some other type of component that interprets and/or executes instructions and/or data. Processor 205 may be implemented as hardware (e.g., a microprocessor, etc.) or a combination of hardware and software (e.g., a SoC, an ASIC, etc. Processor 205 performs one or multiple operations based on an operating system and/or various applications or programs (e.g., software 215).

Memory/storage 210 includes one or multiple memories and/or one or multiple other types of storage mediums. For example, memory/storage 210 may include random access memory (RAM), dynamic random access memory (DRAM), cache, read only memory (ROM), a programmable read only memory (PROM), and/or some other type of memory. Memory/storage 210 may include a hard disk (e.g., a magnetic disk, an optical disk, a magneto-optic disk, a solid state disk, etc.).

Software 215 includes an application or a program that provides a function and/or a process. Software 215 may include firmware. By way of example, software 215 may comprise a telephone application, a multi-media application, an e-mail application, a contacts application, a calendar application, an instant messaging application, a web browsing application, a location-based application (e.g., a Global Positioning System (GPS)-based application, etc.), a camera application, etc. Software 215 includes an operating system (OS). For example, depending on the implementation of main device 105, the operating system may correspond to iOS, Android, Windows Phone, or another type of operating system (e.g., proprietary, BlackBerry OS, etc.).

Communication interface 220 permits main device 105 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 operates according to one or multiple protocols, a communication standard, and/or the like. Communication interface 220 permits communication with ultrasound device 110.

Input 225 permits an input into main device 105. For example, input 225 may include a keyboard, a mouse, a display, a touchscreen, a touchless screen, a button, a switch, an input port, speech recognition logic, and/or some other type of visual, auditory, tactile, etc., input component. Output 230 permits an output from main device 105. For example, output 230 may include a speaker, a display, a touchscreen, a touchless screen, a light, an output port, and/or some other type of visual, auditory, tactile, etc., output component.

Main device 105 may perform a process and/or a function in response to processor 205 executing software 215 stored by memory/storage 210. By way of example, instructions may be read into memory/storage 210 from another memory/storage 210 or read into memory/storage 210 from another device via communication interface 220. The instructions stored by memory/storage 210 causes processor 205 to perform the process or the function. Alternatively, main device 105 may perform a process or a function based on the operation of hardware (processor 205, etc.). As previously described, according to an exemplary embodiment, main device 105 operates based on inputs received from ultrasound device 110.

Figure 2B:
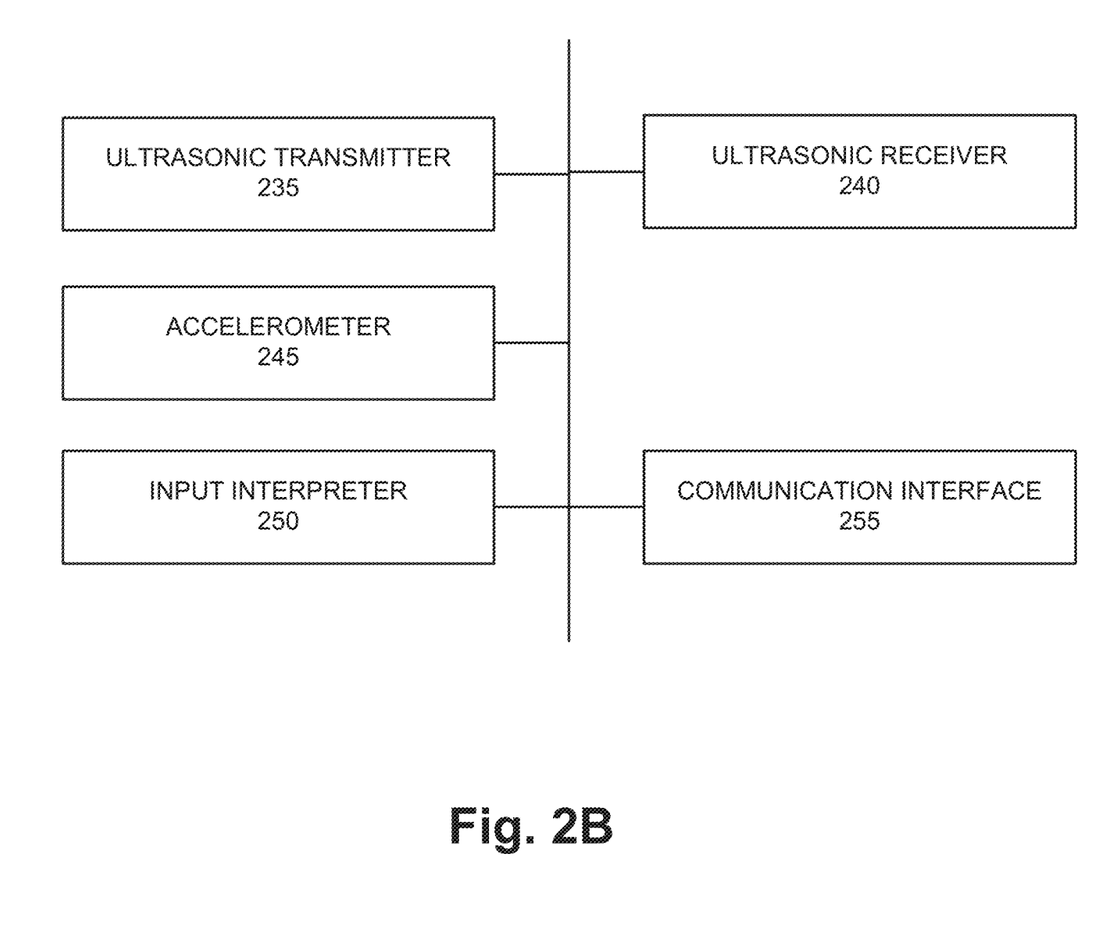
FIG. 2B is a diagram illustrating exemplary components of an ultrasound device.

FIG. 2B is a diagram illustrating exemplary components of ultrasound device 110. As illustrated, according to an exemplary embodiment, ultrasound device 110 includes an ultrasonic transmitter 235, an ultrasonic receiver 240, an accelerometer 245, an input interpreter 250, and a communication interface 255. According to other embodiments, ultrasound device 110 may include fewer components, additional components, different components, and/or a different arrangement of components than those illustrated in FIG. 2B and described herein. For example, ultrasound device 110 may include components of main device 105, such as processor 205, memory/storage 210, software 215, input 225, and/or output 230. Additionally, according to other embodiments, ultrasound device 110 may include a configuration in which one wearable piece includes ultrasonic transmitter 235, while another wearable piece includes ultrasonic receiver 240. The connections between the components are exemplary.

Ultrasonic transmitter 235 transmits an ultrasonic signal. For example, ultrasonic transmitter 235 transmits ultrasonic signals between 20 kHz and 100 kHz. Ultrasonic transmitter 235 may be configured to transmit at a particular center frequency. Ultrasonic transmitter 235 may be implemented using an ultrasound transducer, an ultrasound sensor, or an audio signal generator. For example, a low-cost piezoelectric ultrasound transducer may be used.

Ultrasonic receiver 240 receives an ultrasonic signal. Ultrasonic receiver 240 measures a characteristic of the ultrasonic signal, such as frequency and/or amplitude. Ultrasonic receiver 240 may also measure phase. Ultrasonic receiver 240 may be implemented using an ultrasound transducer, an ultrasound sensor, or other audio codec chip.

Accelerometer 245 includes logic that detects movement. Accelerometer 245 may take the form of a Micro-Electro-Mechanical System (MEMS) sensor. As previously described, accelerometer 245 can be used to detect whether the user's muscle is contracted or a degree of contraction based on the detection of movement stemming from muscle tremor.

Input interpreter 250 includes logic to determine a characteristic of an ultrasonic signal received by ultrasonic receiver 240. For example, as previously described, the characteristic may be the frequency of the ultrasonic signal, the amplitude of the ultrasonic signal, the propagation (e.g., speed) of the ultrasonic signal, and/or the phase of the ultrasonic signal. An ultrasonic signal characteristic may remain static or change over time. Input interpreter 250 may compare an ultrasonic signal characteristic received by ultrasonic receiver 240 to the transmitted ultrasonic signal to identify differences between them and to determine propagation speed. Based on the determined ultrasound characteristic(s), input interpreter 250 may generate an ultrasonic signal profile or ultrasonic signal signature. The ultrasonic signal profile correlates to a particular user action (e.g., the user's gesture on the user's arm, etc.).

Input interpreter 250 uses the ultrasonic signal profile as a basis to select a particular input to be transmitted to main device 105. As described further below, according to an exemplary implementation, input interpreter 250 compares the ultrasonic signal profile to a database that stores ultrasonic signal profiles. Additionally, input interpreter 250 receives data from accelerometer 245. Input interpreter 250 uses this data as a basis to determine the mode of the body touch user action (e.g., the user's limb is in a relaxed state, a contracted state, etc.). Input interpreter 250 uses the mode as a basis to select a particular input, as described further below.

According to an exemplary embodiment, input interpreter 250 includes a pre-trained machine learning algorithm. For example, the pre-trained machine learning algorithm may be based on a sample space of various users, which may have differing muscle mass, body mass index (BMI), age, height, and/or other physical characteristics. The pre-trained machine learning algorithm determines the particular input based on a received ultrasonic signal profile. According to another exemplary embodiment, input interpreter 250 includes a machine learning algorithm that can be trained, on a per-user basis, to calibrate, identify, and map received ultrasonic signals to particular inputs. As previously described, input interpreter 250 may store and use a database to map received ultrasonic signals and accelerometer values to inputs. An exemplary database is described below.

Figure 2C:
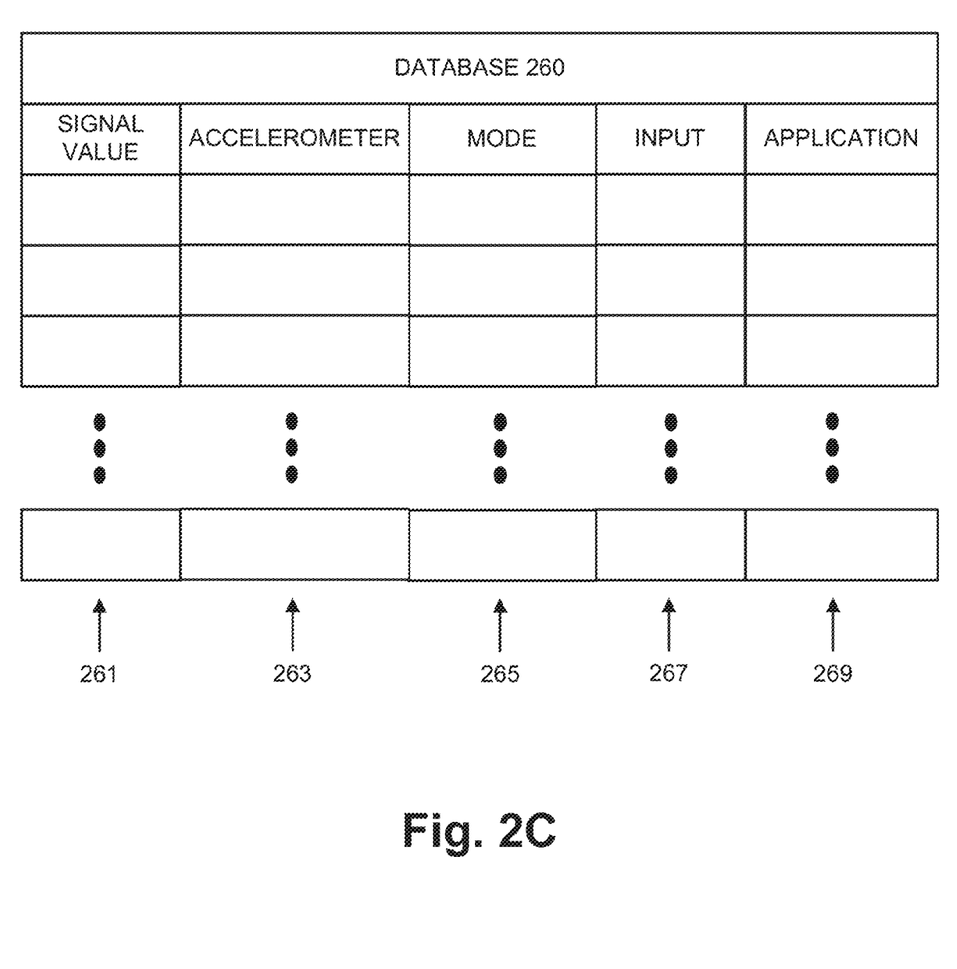
FIG. 2C is a diagram illustrating an exemplary database.

FIG. 2C is a diagram illustrating an exemplary database 260. As illustrated, database 260 includes a signal value field 261, an accelerometer field 263, a mode field 265, an input field 267, and an application field 269. Depending on whether the user of ultrasound device 110 undergoes a training process (versus ultrasound device 110 has been pre-trained), the data stored in database 260 may correspond to actual values obtained through the use of ultrasound device 110 and actions performed by the user, instead of data obtained from other users, etc. Of course, a combination of these methods may be performed in which ultrasound device 110 uses pre-trained values, but also allows the current user to undergo a training process (e.g., to supplement or tweak performance).

Signal value field 261 stores data that indicates a characteristic of ultrasonic signals received via ultrasonic receiver 240. For example, signal value field 261 stores data indicating a signature or profile of ultrasonic signals. The signatures or the profiles may indicate frequency, amplitude, phase, duration, and/or propagation characteristics of ultrasonic signals. Signal value field 261 may also indicate user action data. For example, the user action data indicates characteristics of the action performed by the user, such as type of action (e.g., tap, gesture, etc.), location of action, pressure of action, onset of action, offset of action, etc.

Accelerometer field 263 stores data received from accelerometer 245. For example, accelerometer field 263 stores data indicating a signature or a profile of a mode caused by the contraction of muscles. By way of further example, muscle tremor occurs when a user contracts his or her muscles. The signature of muscle tremor may be indicated by data in accelerometer field 263. As previously described, there may be multiple degrees or levels of contraction of the user's muscles, which may in turn, allow for multiple modes of operation, in addition to a relaxed state. Also, since muscle tremor is in a much lower frequency band (e.g., around 1-20 Hz) than ultrasound, interference may be easily filtered away using, for example, a low-pass filter.

Mode field 265 stores data indicating a mode of operation. For example, a mode may indicate a relaxed state or a contracted state. Alternatively, the mode may indicate a relaxed state or one of multiple contracted states. Still further, a mode may indicate a transition from the relaxed state to a contracted state within a particular time period (e.g., within less than a second, within a second or multiple seconds) or vice versa.

Input field 267 stores data indicating an input. The input can be used to control the operation of main device 105. That is, the input may correspond to any input that could otherwise be performed by the user on main device 105. Given the wide variety of inputs available, the input may correspond to a mouse input (e.g., a single click, a double click, a left button click, a right button click, etc.), a keyboard input (e.g., enter, delete, escape, etc.), a gesture on a touch display (e.g., tap, drag, etc.), etc. The input may be application-specific or global. For example, an application-specific input may be an input that changes the volume of a media player. According to another example, a global input may be a mouse click or an enter command which may apply to various applications of main device 105.

Application field 269 stores data indicating an application to which the input pertains. For example, an input may be to control the volume of a ring tone of a telephone application or a volume of a media player application.

Referring back to FIG. 2B, communication interface 255 permits ultrasonic device 110 to communicate with other devices, networks, systems, etc. For example, communication interface 255 permits communication with main device 105. Communication interface 255 may include one or multiple wireless interfaces and wired interfaces. Communication interface 220 may include one or multiple transmitters, receivers, and/or transceivers. Communication interface 220 operates according to one or multiple protocols, a communication standard, and/or the like.

According to other embodiments, ultrasonic device 110 includes fewer components than those described in FIG. 2B. For example, main device 105 may store database 260 and/or determine the input based on data (e.g., ultrasonic data, accelerometer data) transmitted from ultrasonic device 110 to main device 105. Ultrasound main device 125 may include a combination of components, as described in relation to FIGS. 2A and 2B.

Figure 3:
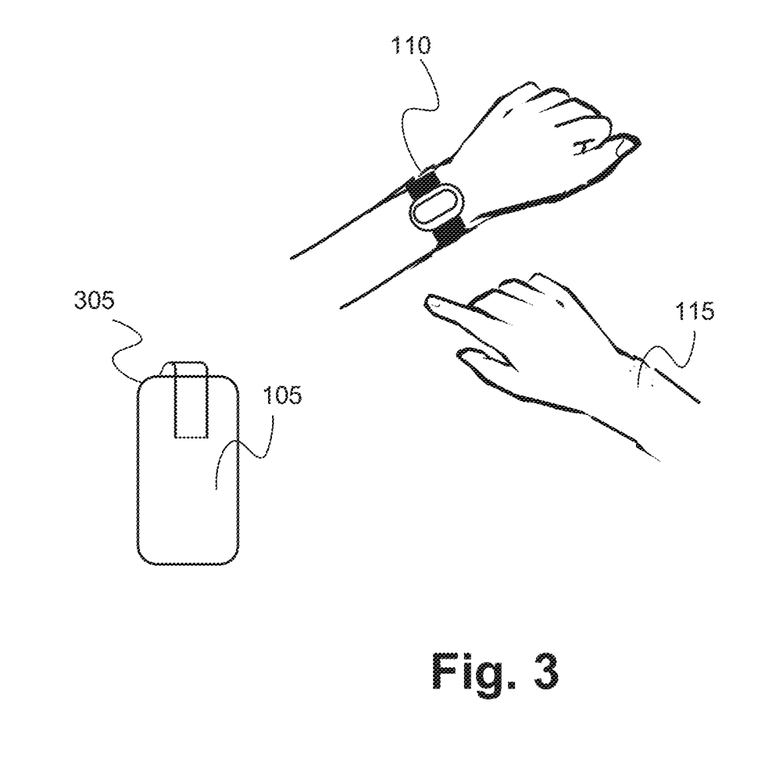
FIG. 3 is a diagram illustrating exemplary scenarios pertaining to an exemplary embodiment of modal body touch ultrasound sensing.

FIG. 3 is a diagram illustrating exemplary scenarios using ultrasound device 110. According to the scenarios described, assume that user 115 is carrying main device 105 in a case 305. However, according to other scenarios, user 115 may have main device 105 in-hand (e.g., as illustrated in FIG. 1A). Alternatively, user 115 may not be carrying main device 105 but merely close to main device 105. For example, main device 105 may correspond to a smart television or other type of user device.

According to an exemplary use case, assume user 115 is jogging and listening to music on main device 105 via earpieces. While jogging, user 115 wishes to adjust the volume of a media player that is playing the music on main device 105. According to this situation, user 115 decides to clench his or her left fist and perform a sliding gesture. Input interpreter 250 obtains values from ultrasonic receiver 240 and accelerometer 245 and uses database 260 to determine the input to be transmitted to main device 105. In this case, the input is to lower the volume of the media player. Ultrasonic device 110 transmits an input signal via communication interface 255 to main device 105 via Bluetooth or other suitable short-range or near-field communication link. Main device 105 receives the input signal via communication interface 220. The media player of main device 105 lowers the volume based on receiving the input signal from ultrasonic device 110.

According to another exemplary use case, assume that user 115 is about to enter a meeting and wishes to mute the telephone ringer. According to this situation, user 115 double taps on his or her left hand while user's left arm is in a relaxed state. In a manner similar to that previously described, ultrasonic device 110 interprets the user's action and mode. In response, ultrasonic device 110 determines the appropriate input. Ultrasonic device 110 generates an input signal and transmits the input signal via communication interface 255 to main device 105. Main device 105 receives the input signal, which causes main device 105 to mute the telephone ringer.

As previously described, modal body touch sensing allows users an increased number of available inputs relative to conventional, single mode, body touch sensing. For example, a relaxed mode, a contracted mode (or degrees thereof), and a transition from one mode to another mode offers users various modalities of interaction coupled with the available actions users may perform in each mode. Additionally, as previously described, the contraction mode or a degree thereof may be determined based on the propagation characteristics of the ultrasonic signals and/or accelerometer 245.

Additionally, the user may skip the cumbersome "activation" phase of using ultrasound device 110, in which the user has to manually activate and deactivate ultrasound sensing on main device 105 and/or ultrasound device 110. Rather, the user may perform a deliberate action to cause body touch sensing to be acted upon. For example, the user may have his or her arm in a relaxed state, which corresponds to a "locked" or "dormant" body sensing state. The user may activate the body sensing by clenching his or her fist or other action so that the user's actions can be interpreted. Alternatively, as described in the scenarios of FIG. 3, the body sensing may be always in an "on" state.

Referring back to FIG. 1B, as previously described, ultrasound main device 125 includes ultrasound device 110. Additionally, ultrasound main device 125 includes one or multiple end user applications or services that are responsive to the user's on-body interaction. For example, main device 125 may include a telephone application, a web browser, and/or other application or service that may operate on main device 105. The process in which ultrasound main device 125 interprets ultrasonic signals, determines mode, etc., and determines an input, may be the same as previously described in relation to ultrasound device 110. Although in this case, there is no need for transmission of the input via communication interface 255 to main device 105, as previously described for ultrasound device 110.

Figure 4:
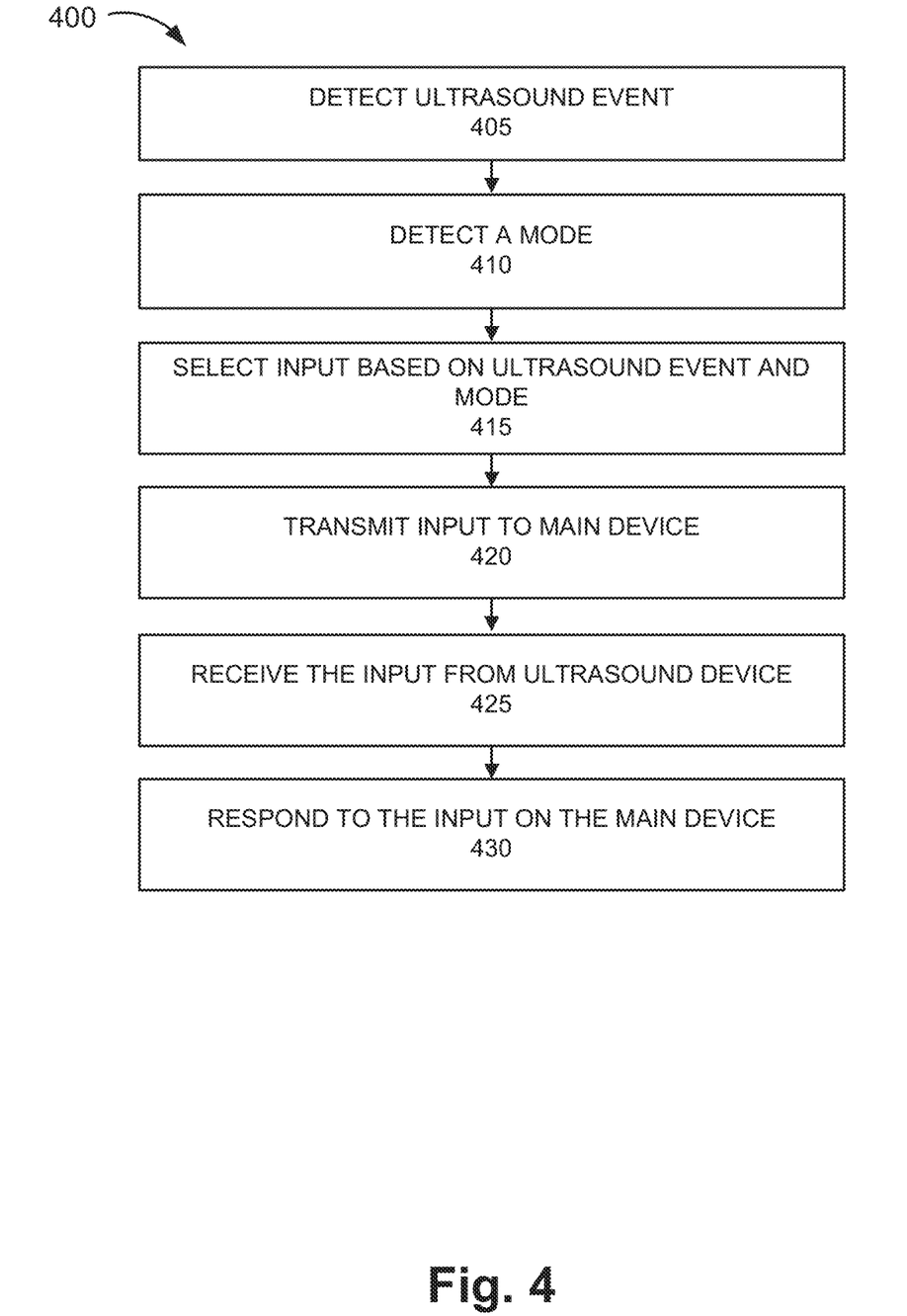
FIG. 4 is a flow diagram illustrating an exemplary process to provide a modal body touch ultrasound sensing service.

FIG. 4 is a flow diagram illustrating an exemplary process 400 to provide modal body touch sensing. A step or an act described in process 400 may be performed by one or multiple components of ultrasound device 110. For example, processor 205 may execute software 215 to perform the step described. According to process 400, assume that ultrasonic device 110 has been trained and able to select an input based on receiving ultrasound events and accelerometer data. Additionally, according to process 400, assume that ultrasonic device 110 is a wristlet device.

Referring to FIG. 4, in block 405, an ultrasound event is detected. For example, ultrasonic receiver 240 receives an ultrasonic signal.

In block 410, a mode is detected. For example, accelerometer 245 detects movement. The movement data from accelerometer 245 may indicate a particular mode, such as a relaxed state of the user's limb, a contracted state of the user's limb, a degree of contraction, or a transition from one state to another.

In block 415, an input is selected based on the ultrasound event and the mode. For example, input interpreter 250 uses the ultrasonic signal characteristic(s) and movement data from accelerometer 245 to select the appropriate input. For example, input interpreter 250 uses database 260 to select the input based on received data.

In block 420, an input is transmitted to a main device. For example, input interpreter 250 generates an input signal. Input interpreter 250 transmits the input signal via communication interface 255 to main device 105.

In block 425, the input is received by the main device. For example, main device 105 receives the input signal via communication interface 220.

In block 430, the main device responds to the input. For example, main device 105 responds to the input. For example, main device 105 executes the input, which in turn, causes main device 105 to perform some action.

Although FIG. 4 illustrates an exemplary process 400 to provide modal body touch sensing, process 400 may include additional operations, fewer operations, and/or different operations than those illustrated in FIG. 4, and as described. For example, ultrasound main device 125 may perform process 400 except the input signal may not need to be transmitted, etc.

The foregoing description of embodiments provides illustration, but is not intended to be exhaustive or to limit the embodiments to the precise form disclosed. Accordingly, modifications to the embodiments described herein may be possible. For example, ultrasonic device 110 and/or ultrasonic main device 125 may include a gyroscope. The gyroscope may provide orientation data. In this way, in addition to multiple modes, orientation may add another dimension to the available inputs. For example, ultrasound device 110 may detect that the user's arm is relaxed and hanging by his or her side versus relaxed and extended outward. Based on these differences, different types of inputs may be mapped.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 4, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, a dedicated processor (not illustrated), etc.) or a combination of hardware and software (e.g., software 215). The embodiments have been described without reference to the specific software code since software can be designed to implement the embodiments based on the description herein and the accompanying drawings.

Additionally, embodiments described herein may be implemented as a non-transitory storage medium that stores data and/or information, such as instructions, program code, data structures, program modules, an application, etc. For example, a non-transitory storage medium includes one or more of the storage mediums described in relation to memory/storage 210.

The terms "comprise," "comprises" or "comprising," as well as synonyms thereof (e.g., include, etc.), when used in the specification is meant to specify the presence of stated features, integers, steps, or components but does not preclude the presence or addition of one or more other features, integers, steps, components, or groups thereof. In other words, these terms are to be interpreted as inclusion without limitation.

In the preceding specification, various embodiments have been described with reference to the accompanying drawings. However, various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   identifying, using data from a sensor, a particular state of a limb of a user on which a device is worn that indicates to activate ultrasound sensing;
   detecting, by the device that is worn by the user, an ultrasound event that includes receipt of an ultrasound signal that is transdermally propagated on the body of the user and effected by an on-body touch in an area in which the ultrasound signal has propagated; and
   selecting, by the device, an input based on the receipt of the ultrasound signal and the state of the limb.

2. The method of claim 1, further comprising:
   transmitting the input to a second device; and
   performing an action specified by the input via the second device.

3. The method of claim 1, further comprising:
   detecting, by the sensor, movement of the limb of the user; and
   determining, by the device, whether the state of the limb is in a contracted state based on the detecting of the movement of the limb.

4. The method of claim 1, wherein the input is one of an input that can be made via a mouse, a keyboard, or a touch display.

5. The method of claim 1, further comprising:
   analyzing a characteristic of the ultrasound signal received, wherein the characteristic includes at least one of frequency, amplitude, or propagation speed; and
   identifying a type of on-body touch based on the analyzing.

6. The method of claim 1, wherein the input is application-specific.

7. The method of claim 1, wherein the on-body touch is a tap or a sliding gesture.

8. A device comprising:
   an ultrasound transducer;
   an accelerometer;
   a memory, wherein the memory stores software; and
   a processor, wherein the processor executes the software to:
      identify, using data from the accelerometer, a particular state of a limb of a user on which the device is worn that indicates to activate ultrasound sensing;
      detect, via the ultrasound transducer, an ultrasound event that includes an ultrasound signal that is transdermally propagated on the body of the user and effected by an on-body touch in an area in which the ultrasound signal has propagated;
      detect a state and a degree of contraction of the limb, wherein the state is a contracted state or a relaxed state; and
      select an input based on a receipt of the ultrasound signal, the state of the limb, and the degree of contraction.

9. The device of claim 8, further comprising:
   a communication interface, wherein the processor further executes the software to:
   transmit, via the communication interface, the input to another device.

10. The device of claim 8, wherein the accelerometer detects movement of the limb, and wherein the processor further executes the software to:
    determine whether the state of the limb is in the contracted state or the relaxed state during a time of the on-body touch based on data received from the accelerometer.

11. The device of claim 8, wherein the input is one of an input that can be made via a mouse, a keyboard, or a touch display.

12. The device of claim 8, wherein the processor further executes the software to:
    analyze a characteristic of the ultrasound signal received, wherein the characteristic includes at least one of frequency, amplitude, or propagation speed; and
    identify a type of on-body touch based on an analysis of the characteristic.

13. The device of claim 8, wherein the processor further executes the software to:
    store a database that includes ultrasound signal profiles, states of the limb, and inputs; and
    use the database to select the input.

14. The device of claim 8, further comprising:
    a machine learning module that allows the user to train the device to recognize particular on-body touch events performed by the user and select inputs corresponding to the on-body touch events.

15. A non-transitory storage medium that stores instructions executable by a processor of a computational device worn by a user, which when executed, cause the computational device to:
    identify, using data from a sensor, a state of a limb of the user on which the computational device is worn that indicates to activate ultrasound sensing;
    detect, via an ultrasound transducer of the computational device, an ultrasound event that includes an ultrasound signal that is transdermally propagated on the body of the user and generated by an on-body touch in an area in which the ultrasound signal has propagated; and
    select an input based on a receipt of the ultrasound signal and the state of the limb.

16. The non-transitory storage medium of claim 15, wherein the instructions comprise instructions to:

analyze a characteristic of the ultrasound signal received, wherein the characteristic includes at least one of frequency, amplitude, or propagation speed; and identify a type of on-body touch based on an analysis of the characteristic.

17. The non-transitory storage medium of claim 15, wherein the instructions comprise instructions to:

store a database that maps ultrasound signal profiles, states of the limb, and inputs; and use the database to select the input.

18. The non-transitory storage medium of claim 15, wherein the instructions comprise instructions to:

determine whether the state of the limb is in a contracted state or a relaxed state during a time of the on-body touch based on data received from the sensor.

* * * * *